(No Model.) 3 Sheets—Sheet 3.
F. C. KNIESE.
MANUFACTURE OF GAS FROM CRUDE PETROLEUM.
No. 352,620. Patented Nov. 16, 1886.
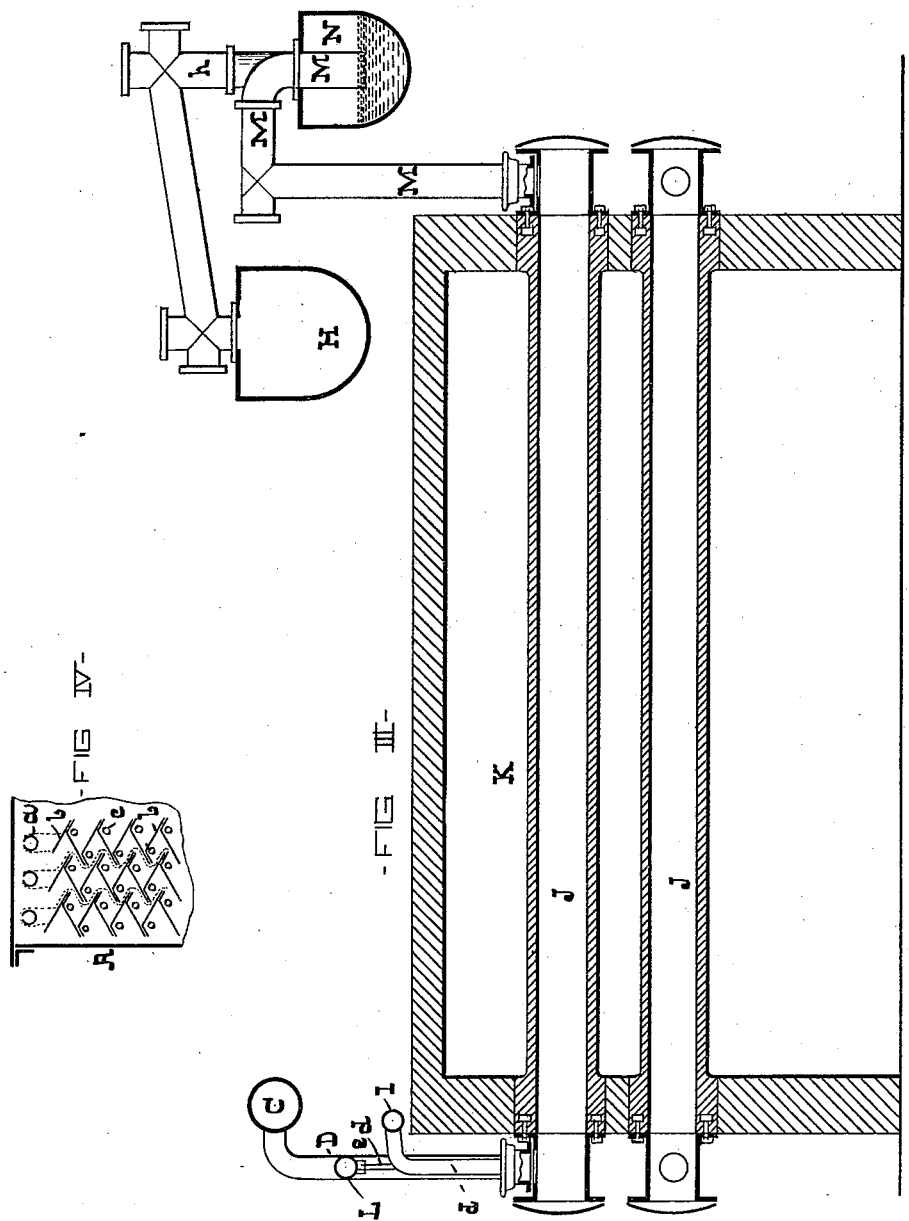
WITNESSES
Dan'l Fisher
Warren Ross.
INVENTOR
Frederick C. Kniese,
by G. H. & W. T. Howard,
atty.

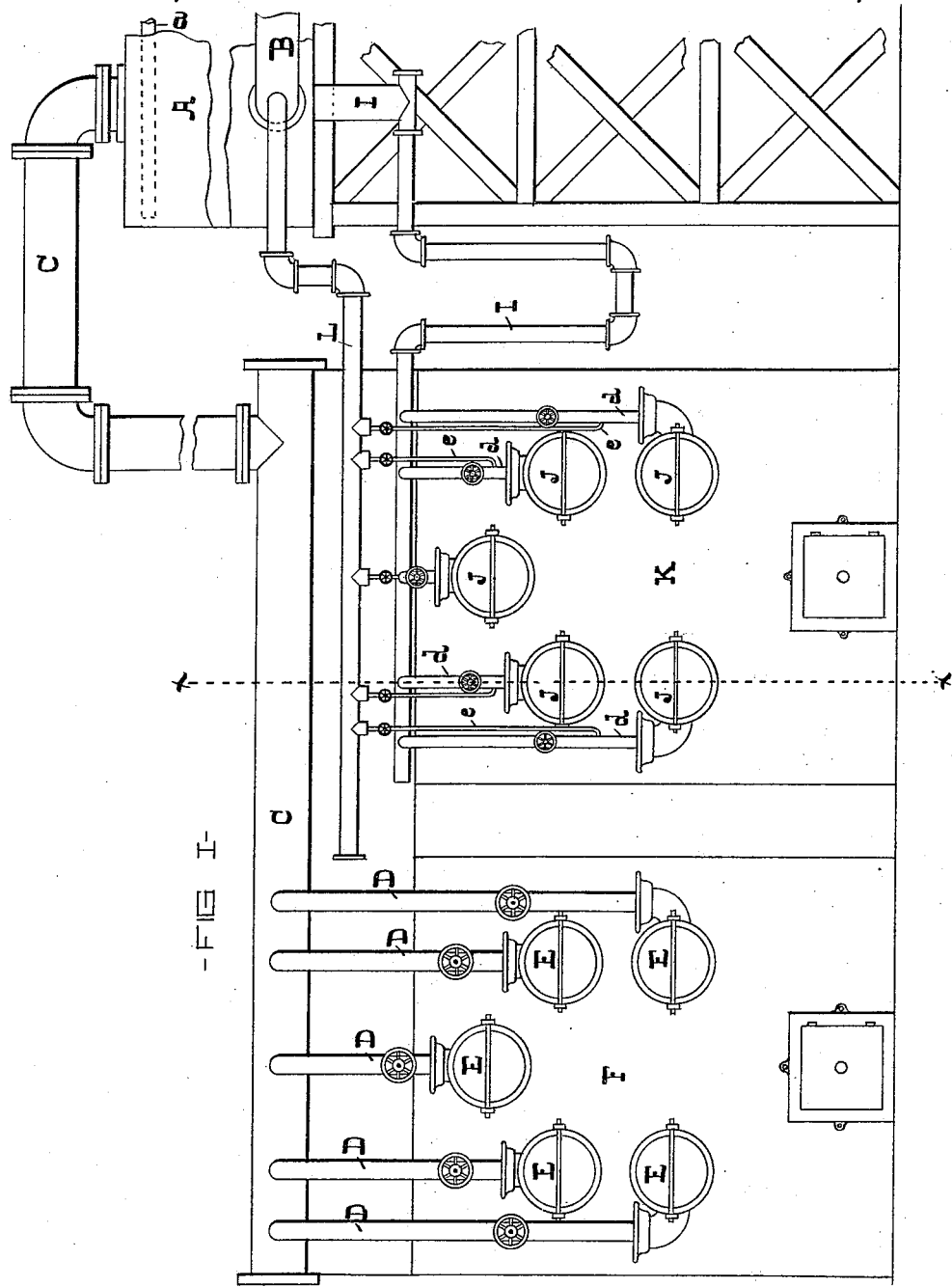

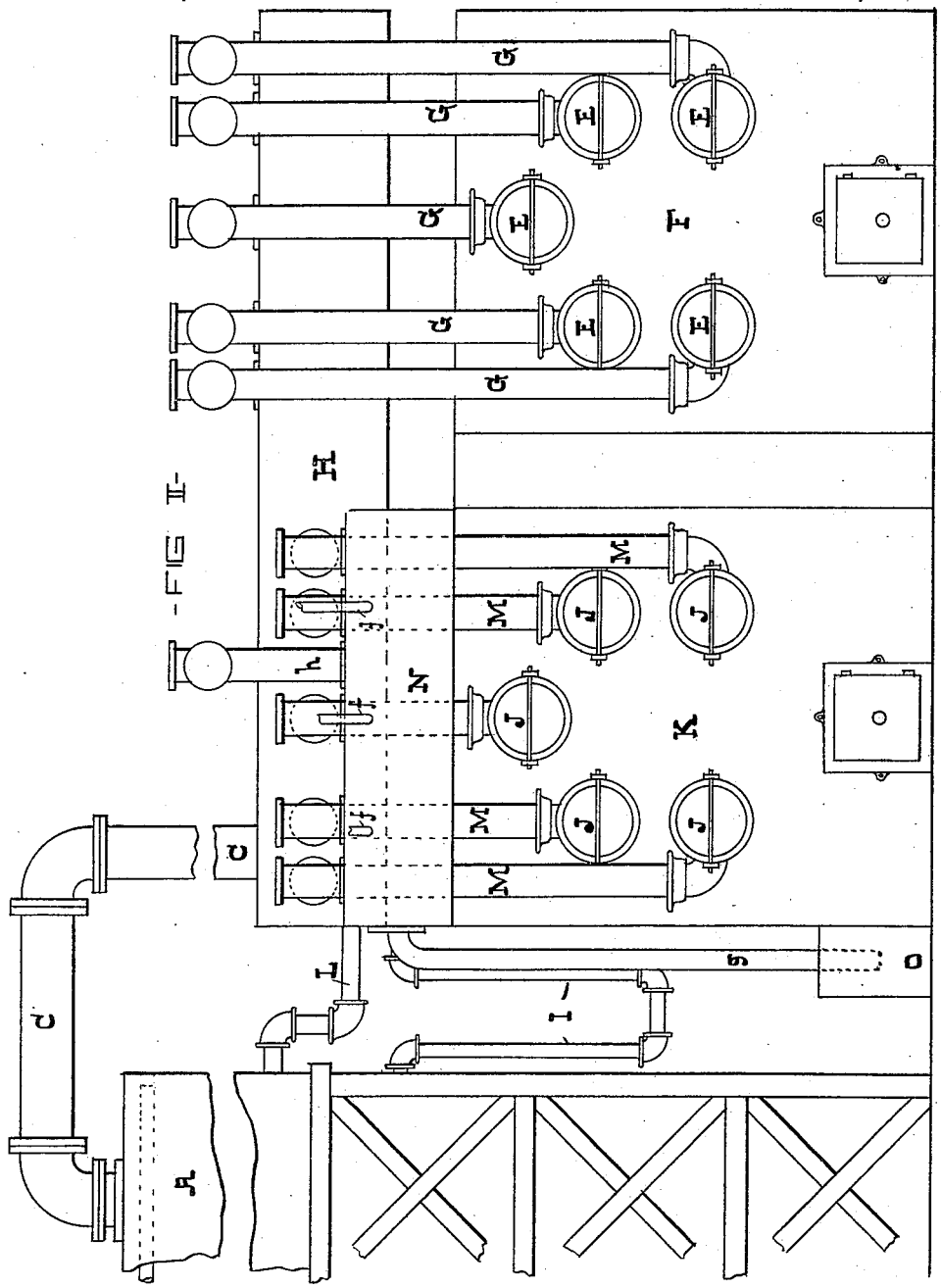

UNITED STATES PATENT OFFICE.

FREDERICK C. KNIESE, OF BALTIMORE, MARYLAND, ASSIGNOR OF TWO-THIRDS TO ALEXANDER ROSS, OF SAME PLACE, AND H. F. ATTRILL, OF GODERICH, CANADA.

MANUFACTURE OF GAS FROM CRUDE PETROLEUM.

SPECIFICATION forming part of Letters Patent No. 352,620, dated November 16, 1886.

Application filed June 25, 1886. Serial No. 206,216. (No specimens.)

*To all whom it may concern:*

Be it known that I, FREDERICK CHARLES KNIESE, of the city of Baltimore, and State of Maryland, have invented certain new and useful Improvements in the Art of Manufacturing Gas from Crude Petroleum, of which the following is a specification.

Hitherto in the manufacture of illuminating-gas from crude petroleum, as well as in enriching or carbureting generator-gas therewith, the oil has either been fed in small streams or through injectors, or vapors from a boiler have been conducted to heated retorts or to incandescent fuel, and the vapor, or mixed gas and vapor, is then passed through a highly-heated chamber, usually partially filled with brick, for the purpose of decomposing and thoroughly mixing the mixture to prevent its condensation. In this treatment of the crude petroleum all of its constituents are subjected to the same high temperature required to convert the heavier portions to a permanent gas. Under this treatment the more volatile and most valuable constituents for the production of illuminating-gas are overheated, and, as a consequence, carbon black or soot and tar are precipitated in the retorts or the fixing-chamber, as well as in the pipe-connections beyond, while the heaviest portions are not all converted into gas.

The object of my invention is to overcome the difficulties referred to; and to this end it consists in separating crude petroleum, in the gas-making process, by heat into its light and heavy constituents, and then treating such products separately in retorts heated, respectively, to the proper temperature to convert the vapors to a fixed gas.

Otherwise stated, it consists, essentially, in conducting a body or stream of crude petroleum to a moderately-heated chamber or separator, where it is separated into vapor and liquid, and conducting thence the liquid portion to a suitable receptacle for further treatment, and in conducting the vapor generated in said chamber, either alone or in connection with generator-gas, to a retort or fixing-chamber heated to the proper temperature to convert such vapor to a fixed gas, and thence to the hydraulic main to be further treated in the usual way.

It also consists in simultaneously conducting the vapor and the liquid constituents resulting from passing a volume or current of crude petroleum through a moderately-heated chamber or separator, either alone or in connection with generator-gas, to separate retorts, one heated to a temperature to convert the light vapor to a fixed gas and the other to such high temperature as to convert the heavier portions to a similar condition.

It is observed that those skilled in the art understand the proper tests required to determine and regulate the proper temperature of the retorts without the use of thermometers.

It is obvious that the apparatus for carrying out my process may be varied almost indefinitely.

In the accompanying drawings, Figure I is a front view of the apparatus which I have found most convenient in carrying out my improved process; Fig. II, a rear view of the same. Fig. III is a sectional view of the apparatus, taken on line $x\ x$ of Fig. I. Fig. IV is a sectional detail of the separator.

In the said drawings, A is a moderately-heated chamber or separator, into which the crude petroleum is first conducted by means of suitable pipes, $a\ a$. The separator may be of any approved form or construction, suitable for the separation of a body of crude petroleum into constituents or elements differing in specific gravity, but it preferably consists of a chamber having zigzag shelves heated by steam-pipes, and suitable means for forming a drip of the petroleum, as shown in application No. 198,199, filed by me on the 8th day of April, 1886, to which reference is made. The construction and arrangement of the shelves are shown in Fig. 4, and they are denoted by $b\ b$.

B is a pipe leading from a generator, in which hydrogen or generator gas is produced, to the separator A. The generator, however, forms no part of the present invention, and is therefore not shown in the drawings.

C is a pipe leading from the upper part of the separator A to carry off, with the generator-gas, the vapor of the lighter constituents of the petroleum which is generated by the presence of the heated steam-pipes c c, Fig. 4. The pipe C has branches d d, to conduct the mixture of generator-gas and the vapor to the retorts E E in the bench F, in which it is subjected to such temperature as will properly combine and fix the gas without overheating it.

The fixed gas leaves the rear end of the retorts E, Fig. 2, through the stand-pipes G G, and passes to the hydraulic main H. The heavier constituent of the petroleum, or that portion thereof which is not vaporized by the heat from the steam-pipes, collects at the bottom of the separator and passes thence through the pipe I and its branches d d to the retorts J J in the bench K. The retorts J J are subjected to a much higher temperature than retorts E E, in order that such heavier constituents may be decomposed and converted into a permanent gas, and as this result is not fully accomplished without the presence of hydrogen or generator gas, I introduce into the branch pipes d d or into the retorts J J a sufficient volume of hydrogen or generator gas for this purpose through the pipe L and its branches e e, the former being connected to the main hydrogen or generator gas pipe B. The gas produced in the retorts J J finds exit at their rear ends, by means of the standpipes M M, to the wash-box N, where it passes through a body of cold water which flows continuously through the box, in order to carry off impurities previously combined with or contained in the gas. f f are water-supply pipes, and g is the overflow-pipe. The impurities are finally caught in the drip-box O, into which the overflow-pipe g discharges. The washed gas is conducted through the pipe h to the hydraulic main H, in which it commingles with the gas from the other retorts.

Obviously the heavy oil or other constituents may be conducted to a storage-tank and the retorts fed from it, and in small gas-works the same retorts may be used at different times for fixing the lighter, as well as the heavier, gaseous vapors; but in all manipulations of the vapors in the fixing operation I subject the lighter to a much lower temperature than I do the heavier portions.

I am aware that it is not uncommon in the manufacture of illuminating-gas to combine with generator-gas the vapor of benzine or naphtha, and that these light petroleum products contain practically no residuum. I am also aware that these light products of petroleum may be converted to a fixed gas in retorts or fixers at a proper temperature, and that succeeding the use of these light products a heavier product of crude petroleum, or crude petroleum may be converted to gas at a different and higher temperature; but in such case a large per cent. of the lighter products of the original body of crude petroleum had escaped and was lost in the well-known process of distillation. I am also aware that it has been proposed to distill or vaporize petroleum or petroleum products in a boiler or vaporizer, and conduct said vapors to retorts where they are decomposed and converted to a fixed gas, and that it has been proposed to graduate the heat under such boiler to correspond with the character of the contents thereof—that is to say, to increase the heat as the contents of the boiler become denser. I am further aware that it has been proposed to vaporize the entire body or volume of crude petroleum, or any hydrocarbon liquid or distillate, and to commingle the same with superheated steam or hydrogen gas in a vaporizer, and conduct the mixture thence to decomposing-retorts; but I am not aware that a body or stream of petroleum has been passed through a moderately-heated chamber and separated into vapor and liquid, the vapor portion conducted to retorts heated to decompose the same, and the liquid portion conducted to retorts heated to a higher degree to decompose such heavy portion; nor am I aware that generator-gas has been introduced to a separator to absorb and conduct the vapors therein produced to one set of decomposing-retorts, while the heavier liquid portion is conducted from said separator.

I therefore claim as my invention—

1. The improvement in the art of manufacturing illuminating-gas from crude petroleum, which consists in conducting a body or stream of crude petroleum to a moderately-heated chamber, thereby producing vapor and liquid, and then separately conducting the vapor to decomposing-retorts heated to one degree of temperature, and at the same time conducting the liquid portions to decomposing-retorts heated to a higher degree of temperature, whereby the respective products are decomposed and converted to permanent gas without overheating either portion, as described.

2. The improvement in the art of manufacturing illuminating-gas from crude petroleum and generator or water gas, which consists in conducting a body or stream of crude petroleum to a moderately-heated separator or chamber, thereby producing vapor and liquid, simultaneously conducting the liquid from the chamber and conducting generator-gas into the same, and said gas and vapor together from said chamber to retorts heated to decompose the vapors and convert them to a fixed gas, as specified.

3. The improved process of making illuminating-gas herein described, which consists in separating crude petroleum in the gas-making process into its light and heavy constituents, and then, with generator-gas, conducting said products separately to retorts heated, respectively, to different degrees of temperature, to decompose and convert the mixture of generator-gas and hydrocarbon vapors into a fixed gas, as described.

4. The improved process of making illuminating-gas, which consists in passing crude petroleum through a moderately-heated chamber, thence, in connection with generator-gas, passing the vapors therein produced to a fixing-chamber, and thence to the hydraulic main, and simultaneously conducting the heavy or liquid portion, in connection with generator-gas, to a separate retort or fixing-chamber, and thence through a washer to the hydraulic main, substantially as described.

FREDERICK C. KNIESE.

Witnesses:
WM. T. HOWARD,
DANL. FISHER.